March 27, 1962 O. J. EKLUND 3,027,426

MEANS FOR SEQUENTIAL SELECTION OF CIRCUITS

Filed March 6, 1957 4 Sheets-Sheet 1

INVENTOR
OSCAR JOHANNES EKLUND

By Hane and Nydick
ATTORNEYS

March 27, 1962 O. J. EKLUND 3,027,426

MEANS FOR SEQUENTIAL SELECTION OF CIRCUITS

Filed March 6, 1957

4 Sheets-Sheet 2

INVENTOR
OSCAR JOHANNES EKLUND
By Hane and Nydick
ATTORNEYS

March 27, 1962 O. J. EKLUND 3,027,426

MEANS FOR SEQUENTIAL SELECTION OF CIRCUITS

Filed March 6, 1957 4 Sheets-Sheet 3

INVENTOR
OSCAR JOHANNES EKLUND
BY Hane and Nydick
ATTORNEYS

March 27, 1962 O. J. EKLUND 3,027,426

MEANS FOR SEQUENTIAL SELECTION OF CIRCUITS

Filed March 6, 1957 4 Sheets-Sheet 4

INVENTOR
OSCAR JOHANNES EKLUND
BY Kane and Nydick
ATTORNEYS

United States Patent Office
3,027,426
Patented Mar. 27, 1962

3,027,426
MEANS FOR SEQUENTIAL SELECTION OF CIRCUITS

Oscar Johannes Eklund, Hagersten, Sweden, assignor to Telefonaktiebolaget L M Ericsson, Stockholm, Sweden, a corporation of Sweden Filed Mar. 6, 1957, Ser. No. 644,237
Claims priority, application Sweden Mar. 7, 1956
5 Claims. (Cl. 179—18)

This invention relates to a selecting means for selection of that electrical circuit out of a number of sometimes broken, sometimes closed electrical circuits, which, among the closed circuits, is first in a sequential order predetermined for all the circuits.

Selection in a determined consecutive order occurs particularly within automatic telephone systems and is effected either by means of mechanical selectors, which start from a determined position, or by means of relay chains. Selection by means of mechanical selectors are too slow for modern telephone systems. Selections by means of relay chains as hereforefore known have the disadvantage that a number of contacts corresponding to the number of circuits must be connected in series, the risk of contact faults thereby being great with regard to the reliability of operation required of such relay chains.

By this invention a decrease of the required number of contacts in the circuits of a relay chain is achieved and long series of contacts are completely avoided.

This is achived according to the invention by means of a row of series connected rectifiers, which transmit current from each circuit to all the circuits which are later in the sequence, and by a core of magnetic material for each of the circuits, which core has a first winding connected to the circuit and traversed by at least a part of the current in the circuit during the selection and a second winding interconnected with said first winding for the next preceding circuit and traversed by at least a part of the current in the next preceding closed circuit, whereby the magnetic fields in said core, which are generated by currents appearing simultaneously in said first and second winding, neutralize each other and the field, which is generated by said first winding, when the second winding is de-energized, effects the selection.

The invention will now be described more in detail with reference to the annexed drawings, FIGS. 1–5.

Figure 1:
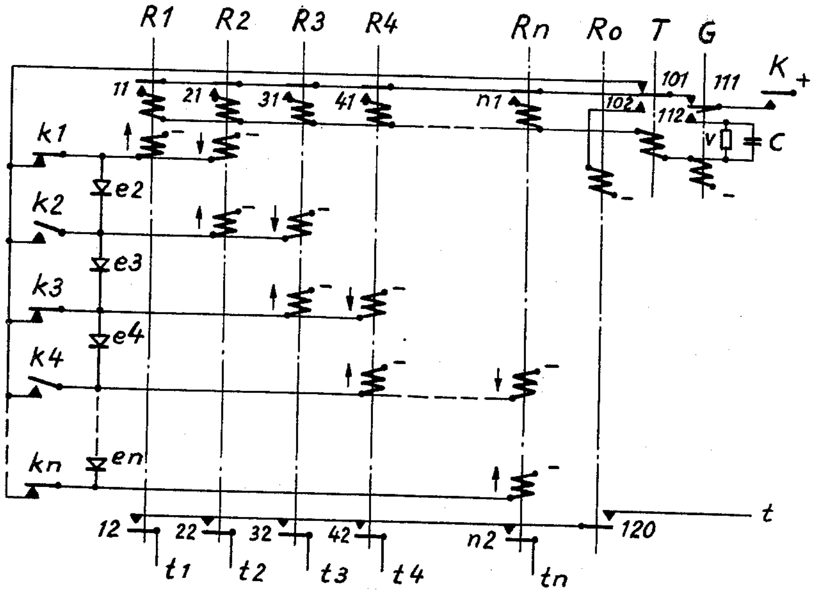
FIGS. 1–2 show the application of the invention to relay chains and two different systems for arranging holding circuits after the selection.

In FIG. 1 *k*1—*kn* are contacts, which keep a number of circuits closed or broken. The contacts *k*1—*kn* may for example pertain to selectors, which sometimes are free, sometimes occupied by conversations, the contact being closed, when the selector is free. There are furthermore three auxiliary relays R*o*, T and G for the control of the relay chain and for each circuit there is a relay R1—R*n*, which interconnects a wire *t*1—*tn*, which is individual for the circuit, with a common wire *t*. The circuits through the contacts *k*1—*kn* are interconnected by means of a row of rectifiers *e*2—*en*. The relay chain is supposed to pertain to a marker in an automatic telephone exchange.

When a free circuit out of the *n* circuits through the contacts *k*1—*kn* is to be selected, the contact K is closed and the circuits are formed through the contacts 111 and 101 and all the closed contacts *k*1—*kn* to minus on one hand through the lowest winding of the relay R1—R*n* corresponding to the respective contact, on the other hand through the next lowest winding of the relay immediately following. The two lower windings of the relays R2—R*n* counteract and balance each other so, that a relay, e.g. R*n*, the two lowest windings of which are traversed by current, is not operated. In the figure it is assumed that the contacts *k*1, *k*3 and *kn* are closed, while *k*2 and *k*4 are opened. As the contact *k*1 is closed, there are formed circuits through the rectifiers *e*2—*en* to all the relays R2—R*n* irrespectively of whether the contacts *k*2—*kn* are closed or not, and thus only the relay R1 can attract its armature. The contacts 11—12 are closed. A holding circuit for the relay R1 is formed from plus through the contacts *k*,111 and 11, the uppermost winding of the realy R1, the windings on the relays T and G, which have a low resistance, to minus. The relay T, but not the relay G, attracts its armature. The contacts 101—102 are actuated. The contact 101 breaks the circuits through the contacts *k*1—*kn* and the contact 102 closes a circuit for the relay R*o*, which is operated. The contact 120 is closed, and then the wire *t*1 is connected to the wire *t* over the contacts 12 and 120.

Now it is assumed that also the contact *k*1 is opened during the selection process. When the contact K is closed, the contact *k*3 now comes first in the sequence. The lowest winding of the relay R3 is energized but not the intermediate winding, because the rectifier *e*3 is blocking and none of the contacts *k*1—*k*2 is closed. All the relays R4—R*n*, however, receive current through their two lower windings over the rectifiers *e*4—*en*, and therefore only the relay R3 attracts its armature. The contacts 31 and 32 are closed. The relays T and R*o* are operated. The contact 120 is closed and the wire *t*3 is connected to the wire *t*.

Thus it is evident that only the relay, which comes first in the sequence, will be operated. As the contacts *k*1—*kn* are closed at points of time distributed at random it may occur that a contact, which comes earlier in the sequence than a just indicated contact, is closed during the operating time of relay T. This may cause that two relays R1—R*n* are simultaneously operated. Thus the current strength in the windings on the relays T and G is increased so that the relay G attracts its armature. The contacts 111 and 112 are actuated. The holding circuit for the relays R1—R*n* and T and the make circuit of the relay R*o* are broken. A condenser C and a high ohmic discharge resistance *v* pertaining to the same are connected in series with the winding on the relay G through the contact 112, the relay G thus being caused to be operated and then to release its armature. Selection will then be made once more immediately and possibly be repeated until any one of the relays R1—R*n* is operated.

Figure 2:
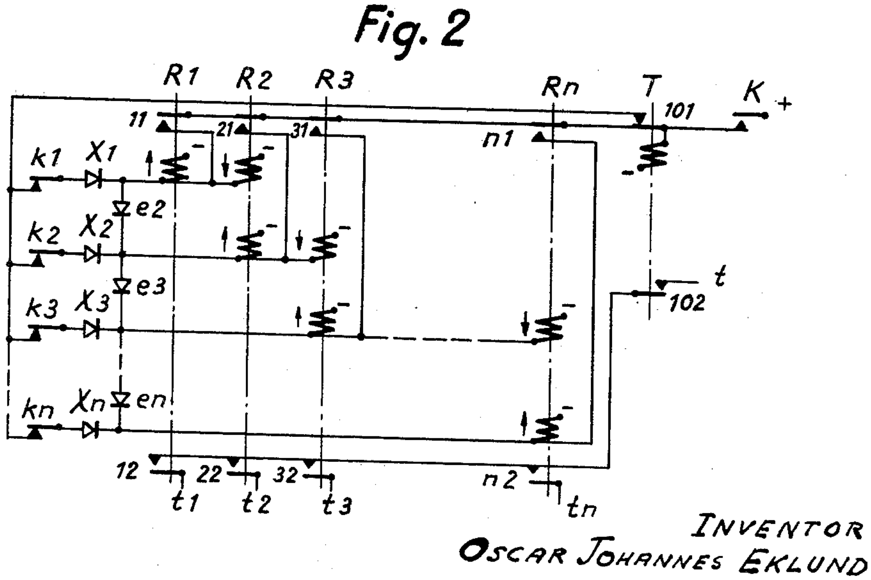

FIG. 2 is a variation of FIG. 1 and shows how a row of rectifiers *e*2—*en* may be used to separate also the holding circuits so, that only one of the relays R1—R*n* at a time may be operated. In series with each of the contacts *k*1—*kn* there is a rectifier *x*1—*xn*. If two relays, e.g. R2 and R3, are operated simultaneously, the relay R3, which is later in the sequence, will always release its armature, also after the relay T has been operated. Through the contacts K and 21 there is cloesd not only a holding circuit for the relay R2 through the lower winding of the relay but also circuits through both the upper and the lower winding of the relay R3, this relay thus being de-energized. The relay T closes the contact 102 and the relay closes the contact 22, the wire *t*2 thus being alone connected to the wire *t*.

Figure 3:
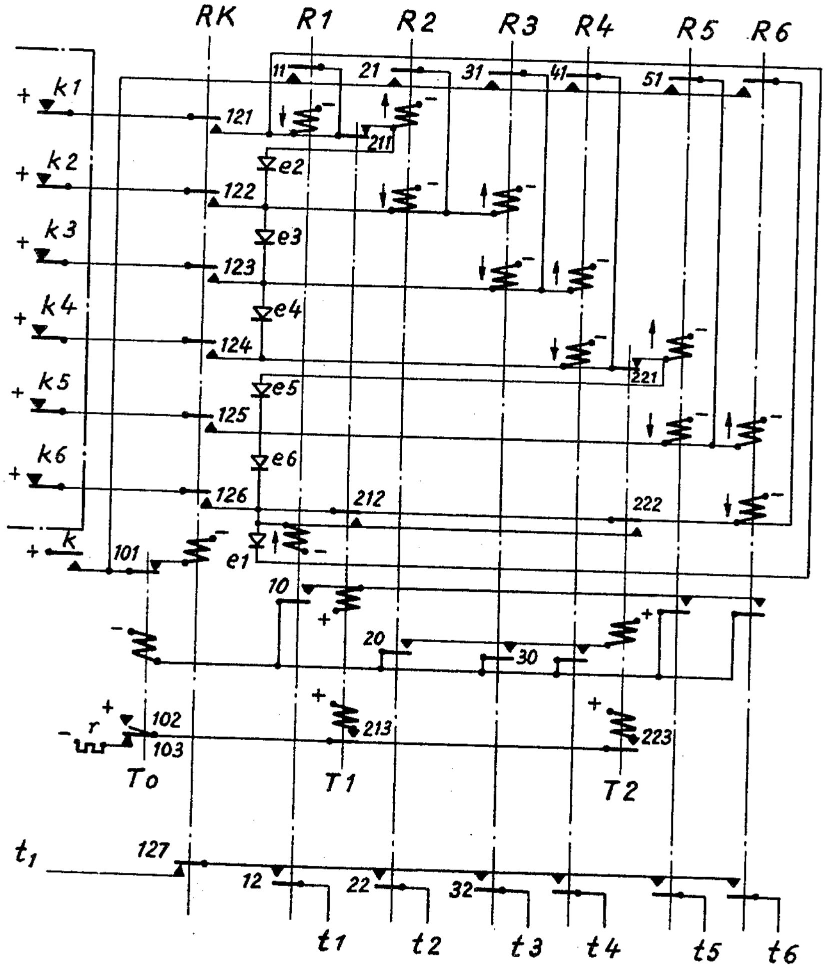
FIG. 3 shows a relay chain according to the invention with a changeable sequence.

In FIG. 3 the contacts *k*1—*k*6 are selector contacts. One contact is closed, when the respective selector is free. When the selector is busy, the contact is opened. The relays R1—R6 form together with the rectifiers e1—e6 a selecting relay chain and the relay R*k* is a connecting relay, which connects six different circuits, each containing one of the contacts *k*1—*k*6, to the selecting relay chain. The relays T1—T2 change the sequence within the selecting relay chain and the relay T*o* is an auxiliary relay. When the contact K is closed, the relay RK is operated and the circuits over the contacts *k*1—*k*6 are connected to the selecting relays R1—R6 through the contacts 121—126. The contact 127 is opened. When the relays take up the position shown in the figure, the relay R1 comes first in the sequence. The relay chain works in conformity with the description of FIG. 2. The condition according to FIG. 3 is however an exceptional condition, which only arises, if the connecting lines of the relay chain to the exchange battery are broken. Normally one of the relays T1 and T2 is operated by the following process.

When one of the relays R1—R6, e.g. R2, attracts its armature, the contacts 20—22 are closed. The relays T*o* and T2 are operated. The contacts 101—103 and 221—223 are actuated. The relay RK releases its armature. The relay R2 is kept operated through the contact 21. When the relay T2 is operated, the sequence is switched so, that the relay R4 comes last and the relay R5 is first in the sequence. The relays R3 and R4 are not operated because they receive current through both their windings. The other relays will be de-energized. The wire *t*2 is connected to the wire *t* and a switching operation is supposed to take place in the circuit thus formed. After this switching operation the contact K is opened and the relay R2 releases its armature. The relay T*o* releases swiftly, as the relay T2 is more slow-releasing owing to its lower winding being short-circuited over the contacts 223 and 102 until the relay T*o* has released its armature. The contact 103 is hereby closed and the relay T*o* is kept in an operated position through the resistance *r* and the contacts 103 and 223. At the next selection one of the relays R5, R6, R1 is operated, if the corresponding selector is free. It is here assumed that the relay R1 is operated. The contacts 10—12 are closed. The relays T*o* and T1 are operated. The relay T2 releases its armature. The wire *t*1 is connected to the wire *t*. After the end of the switching operation the relays R1 and T*o* are released, while the relay T1 is held in a circuit through the contacts 103 and 212. Then the relay R2 comes first in the selecting relay chain.

Figure 4:
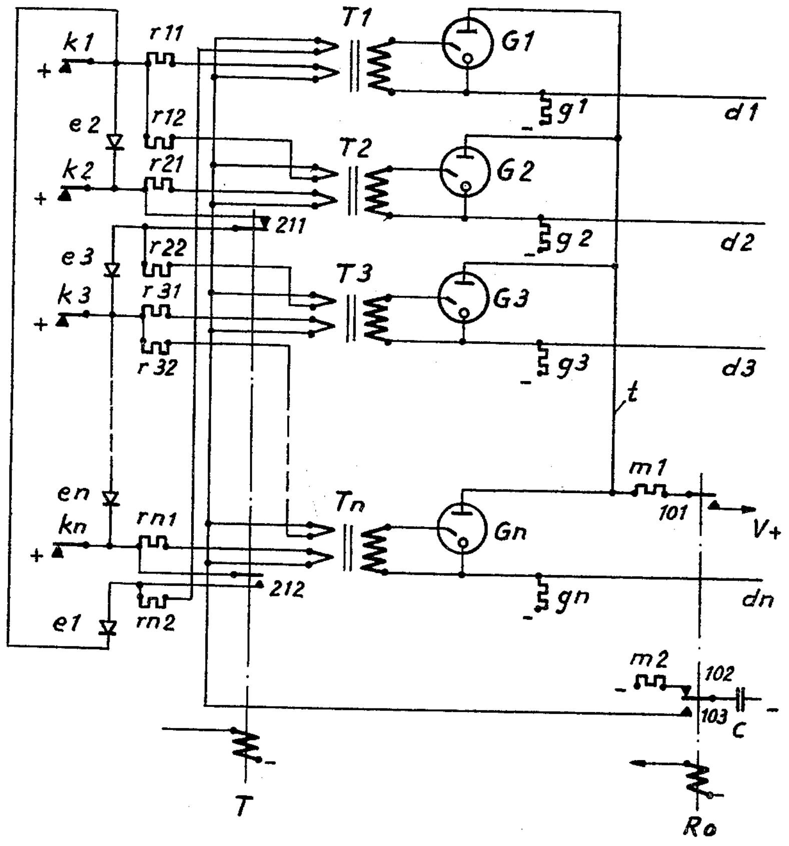
FIGS. 4–5 show selecting means with transformers, through which glow discharge tubes and amplifiers are energized.

FIG. 4 shows the application of the invention to a means performed with transformers T1—T*n* and the glow discharge tube G1—G*n*. Each transformer has two primary windings to the left in the figure and a secondary winding to the right in the figure. The primary windings counteract each other and correspond to the windings on the relays R1—R*n* in FIGS. 1–3. Each primary winding is connected in series with one of the current limiting resistances *r*11—*rn*2. The contacts *k*1—*kn* and the rectifiers *e*2—*en* have their correspondence in FIGS. 1–3. The relay T changes the sequence and the relay R*o* begins and ends the switching operation.

When the relay R*o* is operated, the contacts 101—103 are actuated. The condenser C is recharged, a current impulse thereby being obtained through the closed contact *k*1—*kn*, which comes first in the sequence, the rectifiers *e*2—*en* and the resistances *r*11—*rn*1 through the lower primary winding of all the transformers T1—T*n* and through the resistances *r*12—*rn*2 through the upper primary winding of all the transformers T1—Tn except the one which comes first in the sequence. If the contact *k*1 is closed, the transformer T1 will receive a current impulse only through its lower winding, because the contact 212 is not closed, while all the succeeding transformers T2—T*n* receive a current impulse through the two primary windings. Only in the second winding of the transformer T1 there is thus induced a voltage, which ignites the ignition path of the glow discharge tube G1. Then the main path of the glow discharge tube G1 is ignited, a circuit from the voltage V+ thereby being closed, through the contact 101, the resistance *m*1, the wire *t*, the glow discharge tube G1, the resistance *g*1, to minus. The voltage drop through the resistance *g*1 is supplied to the wire *d*1.

If there is any risk that more than one of the transformers T1—T*n* may simultaneously receive a current impulse and thus more than one glow discharge tube G1—G*n* be ionized on the ignition path, the resistance *m*1 will be given so high a value, that only one glow discharge tube at a time may ignite its main path. After each selection the wire *d*1 is alone connected to the wire *t* and a switching operation is supposed to take place whereby the resistance *m*1 can be short-circuited, if desired. After the end of the switching operation the relay R*o* is released and the condenser C is discharged through the resistance *m*2.

By means of the relay T the sequence in the selecting means may be changed so that the glow discharge tube G3 and the wire *d*3 come first in the sequence. The relay T breaks the circuit through the resistance *r*22 and the upper primary winding of the transformer T3 by means of the contact 211. At the same time the upper primary winding of the transformer T1 is connected by means of the contact 212. In FIG. 4 the primary windings of the transformers are lying in circuits which are connected in parallel.

Figure 5:
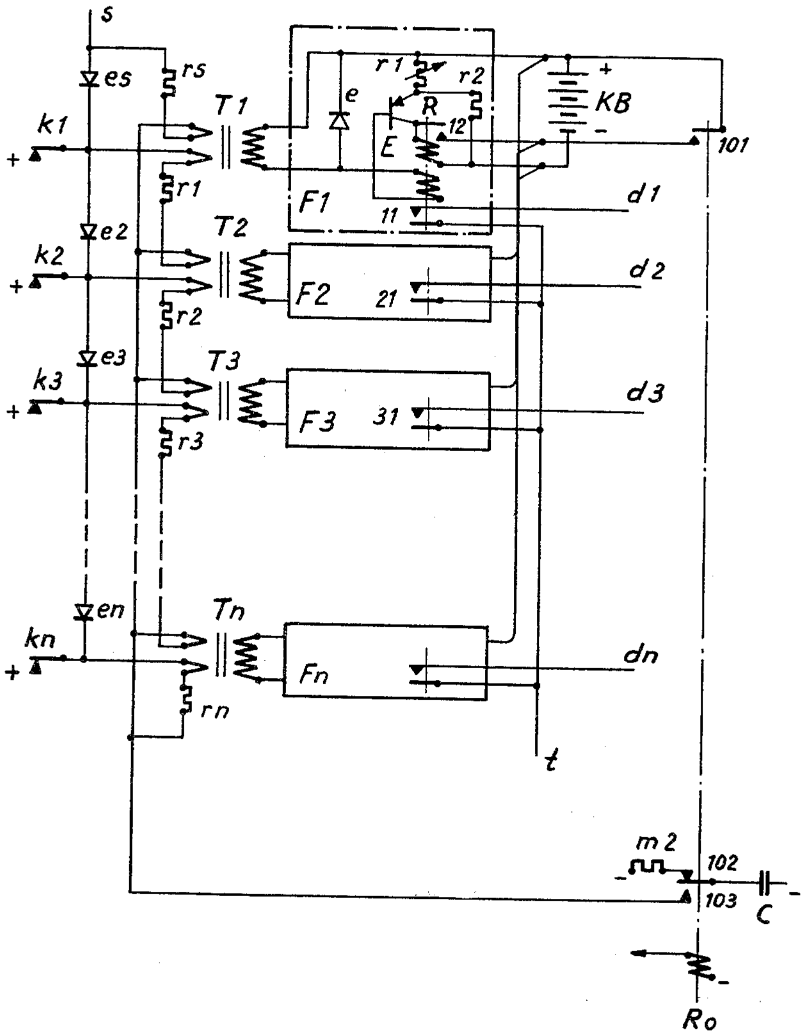

FIG. 5 shows an embodiment with transformers T1—T*n* and rectifiers *e*2—*en*, the lower primary winding in each transformer being connected in series with the upper primary winding of the transformer immediately following. Each of the secondary windings of the transformers is connected to an amplifier device F1—F*n* with a relay. The amplifier device F1, the principle of which is shown in the figure, contains a rectifier *e*, a transistor E, a relay R and two resistances *r*1 and *r*2, which form a voltage divider imposing a bias voltage upon the emitter of the transistor. A battery KB and a relay R*o* are common to the amplifiers F1—F*n*. A rectifier *es* and a resistance *rs* are connected in series with the upper winding of the transformer T1, which may be energized if the wire *s* is connected to plus.

When the relay R*o* attracts its armature, the contacts 101—103 are actuated. The condenser C is recharged by means of currents through the resistances *r*1—*rn* and the windings of the transformers. The transformer T1 is first in the sequence. If the contact *k*1 is closed, a current impulse will be received through the lower winding of the transformer T1, the resistance *r*1, the upper winding of the transformer T2, the contact 103, the condenser C, to minus. Through the rectifiers *e*2—*en* current is received through all the succeeding primary windings of the transformers, the effect of the currents thereby neutralizing each other. In the secondary winding of the transformer T1 there is induced a voltage in the blocking direction of the rectifier *e* which voltage is higher than the bias voltage between the emitter of the transistor E and the base electrode. The collector of the transistor and the upper winding of the relay R are operated, a voltage being induced in the lower winding of the relay R in such a direction, that there arises a current through this winding, the rectifier *e*, the resistance *r*1 and the transistor R independently of the transformer T1. A short initiating current impulse through the lower primary winding of the transformer T1 thus starts a step, which results in the relay R attracting its armature. The contacts 11—12 are closed. The relay R is then kept operated through the contacts 101 and 12 and the wire *d*1 is connected to the wire *t*. As only an extremely short and weak current impulse is needed to start the step, the condenser C may be quite small and the probability that one of the contacts *k*1—*kn* may be closed during the starting is extremely small.

In markers for automatic telephone exchanges there are a number of selecting relay chains and it is desirable sometimes to block a selecting relay chain in favor of another. For this purpose there are the rectifiers *es* and the resistance *rs* and the blocking wire *s*. If + is connected to the wire *s*, the recharging current to the condenser C will be equally distributed upon the primary windings of all the transformers and none of the amplifiers F1—F*n* is so operated that the bias voltage of the emitter is exceeded.

I claim:

1. A selecting system for selecting among a plurality of sometimes busy and sometimes idle electric circuits the electric circuit which among the idle circuits is the first one in a sequence predetermined for all the circuits, said system comprising a row of rectifiers connected in series, said rectifiers transmitting current from each circuit to all the circuits succeeding in the sequence, and an inductive means for each of the circuits, each of said inductive means having a first winding connected to the respective circuit and traversed by at least a part of the current of said circuit during the selection and a second winding interconnected with the first winding of the inductive means for the respective next preceding circuit and traversed by at least a part of the current in the next preceding idle circuit, the first and second winding of each inductive means being so connected that the magnetic fields generated by currents appearing simultaneously in said first and second winding neutralize each other and the magnetic field generated by current in said first winding when no current flows in the second winding energize the respective inductive means, the energized inductive means effecting the selection.

2. A selecting system according to claim 1 wherein said inductive means for each circuit comprise an electromagnetic relay having said first and said second winding, said relay being energized when current passes through the first winding only.

3. A selecting system according to claim 1 wherein said inductive means for each circuit comprise a transformer having said first and said second winding and having further a third winding, said system also comprising a glow discharge tube for each circuit, each of said tubes having a man path and an ignition path, said third winding of each transformer being connected in the ignition path of the respective tube, and an impedance means common to all the glow discharge tubes connected to the main path of the tubes and having an impedance such that only one glow discharge tube at a time is capable of igniting its main path.

4. A selecting system according to claim 1 wherein said inductive means for each circuit comprise a transformer having said first and said second winding and having further a third winding, said system also comprising an amplifier, and an electromagnetic relay for each of said circuits, said third winding being connected to the input of said amplifier and said relay to the output thereof.

5. A selecting system according to claim 1 wherein said inductive means comprise an electromagnetic relay having said first and second winding, said relay being operated when the current passes through the first winding only, said system also comprising a contact device for breaking after a short selection moment the current in all said circuits, each of said relays having a contact closing a holding circuit for the respective relay through said first winding thereof when the relay is operated during the selection moment, the holding circuit of the first relay in the sequence de-energizing all operated relays which are later in the sequence.

References Cited in the file of this patent

UNITED STATES PATENTS

| | | |
|---|---|---|
| 2,547,011 | Jacobsen | Apr. 3, 1951 |
| 2,600,648 | Herrick | June 17, 1952 |
| 2,713,681 | Johnson | July 19, 1955 |

FOREIGN PATENTS

| | | |
|---|---|---|
| 731,204 | Great Britain | June 1, 1955 |